(12) United States Patent
Zhu et al.

(10) Patent No.: US 10,129,840 B2
(45) Date of Patent: Nov. 13, 2018

(54) METHOD, DEVICE, AND SYSTEM FOR NOTIFYING TERMINAL TYPE SUPPORTED BY CURRENT CELL

(71) Applicant: Huawei Technologies Co., Ltd., Shenzhen (CN)

(72) Inventors: Song Zhu, Beijing (CN); Guangwei Yu, Beijing (CN); Xiaolong Guo, Beijing (CN); Weiliang Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 15/246,231

(22) Filed: Aug. 24, 2016

(65) Prior Publication Data

US 2017/0013574 A1 Jan. 12, 2017

Related U.S. Application Data

(63) Continuation of application No. PCT/CN2014/072500, filed on Feb. 25, 2014.

(51) Int. Cl.
*H04W 56/00* (2009.01)
*H04W 48/08* (2009.01)
(Continued)

(52) U.S. Cl.
CPC ......... *H04W 56/001* (2013.01); *H04W 16/26* (2013.01); *H04W 48/08* (2013.01);
(Continued)

(58) Field of Classification Search
CPC ... H04W 16/26; H04W 48/08; H04W 56/001; H04W 72/042; H04W 88/02; H04W 88/08
(Continued)

(56) References Cited

U.S. PATENT DOCUMENTS

2011/0216731 A1* 9/2011 Frederiksen .......... H04W 48/12
370/329
2013/0121317 A1* 5/2013 Lee ....................... H04L 5/0042
370/336
(Continued)

FOREIGN PATENT DOCUMENTS

CN 101867979 A 10/2010
CN 103220711 A 7/2013
(Continued)

OTHER PUBLICATIONS

"Discussion on new UE category for low cost MTC UE and coverage enhancement mode capability," 3GPP TSG RAN WG2 Meeting #84, San Francisco, California, R2-134039, 3rd Generation Partnership Project, Valbonne, France (Nov. 11-15, 2013).
(Continued)

*Primary Examiner* — Stephen J Clawson
(74) *Attorney, Agent, or Firm* — Leydig, Voit & Mayer, Ltd.

(57) ABSTRACT

The present invention provides a method, a device, and a system for notifying a terminal type supported by a current cell, so that a UE can identify the terminal type supported by the current cell as soon as possible. The method includes: carrying preset indication information in a downlink signal, where the indication information is used to indicate the terminal type supported by the current cell, the preset indication information is agreed upon by a network side and a terminal in advance, and the indication information is a synchronization sequence or a first indicator bit used to indicate the supported terminal type; and sending the downlink signal to the terminal.

16 Claims, 3 Drawing Sheets

(51) Int. Cl.
*H04W 16/26* (2009.01)
*H04W 72/04* (2009.01)
*H04W 88/02* (2009.01)
*H04W 88/08* (2009.01)

(52) U.S. Cl.
CPC .......... *H04W 72/042* (2013.01); *H04W 88/02* (2013.01); *H04W 88/08* (2013.01)

(58) Field of Classification Search
USPC ........................................................ 370/350
See application file for complete search history.

(56) References Cited

U.S. PATENT DOCUMENTS

| | | | |
|---|---|---|---|
| 2013/0136064 A1* | 5/2013 | Jamadagni | H04L 69/26 370/328 |
| 2013/0294399 A1* | 11/2013 | Lee | H04W 4/005 370/330 |
| 2014/0254452 A1* | 9/2014 | Golitschek Edler Von Elbwart | H04W 52/0216 370/311 |
| 2014/0341116 A1* | 11/2014 | Chen | H04W 24/10 370/328 |
| 2015/0009883 A1 | 1/2015 | Bai et al. | |
| 2017/0013574 A1* | 1/2017 | Zhu | H04W 48/08 |
| 2017/0134879 A1* | 5/2017 | Wong | H04W 4/005 |
| 2017/0257264 A1* | 9/2017 | Liu | H04L 41/0803 |

FOREIGN PATENT DOCUMENTS

| | | |
|---|---|---|
| CN | 103298090 A | 9/2013 |
| CN | 103533598 A | 1/2014 |
| DE | 2672756 A1 | 11/2013 |
| WO | 2007113457 A1 | 10/2007 |
| WO | WO 2010050719 A2 | 5/2010 |
| WO | 2013027395 A1 | 2/2013 |
| WO | WO 2013028006 A2 | 2/2013 |
| WO | WO 2013116984 A1 | 8/2013 |

OTHER PUBLICATIONS

"RAN2 impacts of Low Cost MTC," 3GPP TSG-RAN WG2 #85, Prague, Czech Republic, R2-140277, 3$^{rd}$ Generation Partnership Project, Valbonne, France (Feb. 10-14, 2014).

"PRACH Support for Coverage Enhanced (CE) Devices," 3GPP TSG-RAN WG1 Meeting #76, Prague, Czech Republic, R1-140189, 3rd Generation Partnership Project, Valbonne, France (Nov. 10-14, 2014).

"RAN2 impacts for Low Cost MTC," 3GPP TSG-RAN WG2 #84, San Francisco, USA, R2-133917, 3rd Generation Partnership Project, Valbonne, France (Nov. 11-15, 2013).

* cited by examiner

METHOD, DEVICE, AND SYSTEM FOR NOTIFYING TERMINAL TYPE SUPPORTED BY CURRENT CELL

CROSS-REFERENCE TO RELATED APPLICATIONS

This application is a continuation of International Application No. PCT/CN2014/072500, filed on Feb. 25, 2014, which is hereby incorporated by reference in its entirety.

TECHNICAL FIELD

The present invention relates to the field of communications technologies, and in particular, to a method, a device, and a system for notifying a terminal type supported by a current cell.

BACKGROUND

In a future communications system, a terminal (UE) of a new type will emerge. The terminal of the type has features different from those of an existing terminal. For example, compared with the existing terminal, the terminal of the type supports only narrower bandwidth, supports fewer types of modulation and coding scheme s, supports a simpler modulation and coding scheme, has a higher requirement on power saving, and has a higher requirement on coverage enhancement.

The terminal of the new type is referred to as a narrowband UE below.

To make the narrowband UE compatible with an existing Long Term Evolution (LTE) network, a dedicated sub-band may be allocated to the narrowband UE. Bandwidth of the dedicated sub-band does not exceed a receiving capability of the narrowband UE.

In addition, to make the narrowband UE compatible with the LTE network, the narrowband UE needs to identify whether a current cell supports the terminal of the type. If the narrowband UE can identify whether the current cell supports the terminal of the type as soon as possible, the terminal has a better power saving effect.

SUMMARY

The present invention provides a method, a device, and a system for notifying a terminal type supported by a current cell, so that a UE can identify the terminal type supported by the current cell as soon as possible.

According to a first aspect, the present invention provides a method for notifying a terminal type supported by a current cell, including:

carrying preset indication information in a downlink signal, where the indication information is used to indicate the terminal type supported by the current cell, the preset indication information is agreed upon by a network side and a terminal in advance, and the indication information is a synchronization sequence or a first indicator bit used to indicate the supported terminal type; and sending the downlink signal to the terminal.

With reference to the first aspect, in a first possible implementation manner, carrying the synchronization sequence in a predetermined location of the downlink signal.

With reference to the first aspect or the first possible implementation manner, in a second possible implementation manner, adding the synchronization sequence to any location or the predetermined location of the downlink signal.

With reference to the second possible implementation manner of the first aspect, in a third possible implementation manner, the physical resource is a time domain resource, a frequency domain resource, or a code domain resource.

With reference to any one of the first aspect to the third possible implementation manner, in a fourth possible implementation manner, the method further includes: selecting, according to a preset correspondence between a coverage enhancement level and a synchronization sequence, the synchronization sequence corresponding to a coverage enhancement level that can be supported by the current cell, where different coverage enhancement levels are respectively corresponding to different synchronization sequences in the correspondence; and carrying the selected synchronization sequence in the downlink signal.

With reference to any one of the first aspect to the third possible implementation manner, in a fifth possible implementation manner, selecting, according to a preset correspondence between a coverage enhancement level and relevant information of a physical resource occupied by a synchronization sequence, relevant information that is of a physical resource occupied by the synchronization sequence and that is corresponding to a coverage enhancement level that can be supported by the current cell, where different coverage enhancement levels are respectively corresponding to relevant information of different physical resources in the correspondence, and the relevant information of the physical resource includes type information and location information that are of the physical resource; and determining the physical resource according to the selected relevant information of the physical resource, and carrying the synchronization sequence on the physical resource.

With reference to the first aspect or the first possible implementation manner, in a sixth possible implementation manner, the method further includes: selecting, according to a preset correspondence between synchronization sequence density and a coverage enhancement level, synchronization sequence density corresponding to a coverage enhancement level that can be supported by the current cell, where different coverage enhancement levels are respectively corresponding to different synchronization sequence density in the correspondence; and carrying, in the downlink signal, the synchronization sequence sorted according to the selected synchronization sequence density.

With reference to the first aspect or the first possible implementation manner, in a seventh possible implementation manner, the method further includes:

selecting, according to a preset correspondence between a coverage enhancement level and a value of a second indicator bit, a value that is of a second indicator bit and that is corresponding to a coverage enhancement level that can be supported by the current cell, where different coverage enhancement levels are respectively corresponding to different values of the second indicator bit in the correspondence; and carrying the second indicator bit in the downlink signal, where the second indicator bit is set to the selected value of the second indicator bit.

With reference to the first aspect or the first possible implementation manner, in an eighth possible implementation manner, the method further includes:

selecting, according to a preset correspondence between a coverage enhancement level and a frequency hopping manner, a frequency hopping manner corresponding to a coverage enhancement level that can be supported by the current cell, where different coverage enhancement levels are respectively corresponding to different frequency hopping manners in the correspondence; and generating the downlink signal according to the selected frequency hopping manner.

With reference to the first aspect or the first possible implementation manner, in a ninth possible implementation manner, the terminal type includes a narrowband terminal.

According to a second aspect, the present invention provides a method for notifying a terminal type supported by a current cell, including:

receiving a downlink signal sent by the current cell; and determining, according to preset indication information carried in the downlink signal, the terminal type supported by the current cell, where the preset indication information is agreed upon by a network side and a terminal in advance, and the indication information is a synchronization sequence or a first indicator bit used to indicate the supported terminal type.

With reference to the second aspect, in a first possible implementation manner, the method includes: determining that the synchronization sequence is carried in a predetermined location of the downlink signal.

With reference to the second aspect or the first possible implementation manner, in a second possible implementation manner, the method further includes:

acquiring, according to a preset correspondence between a synchronization sequence and a coverage enhancement level, a coverage enhancement level corresponding to the synchronization sequence, where different coverage enhancement levels are respectively corresponding to different synchronization sequences in the correspondence; and determining the acquired coverage enhancement level as a coverage enhancement level that can be supported by the current cell.

With reference to the second aspect or the first possible implementation manner, in a third possible implementation manner, the method further includes:

determining relevant information of a physical resource occupied by the synchronization sequence;

acquiring, according to a preset correspondence between a coverage enhancement level and relevant information of a physical resource occupied by a synchronization sequence, a coverage enhancement level corresponding to the determined relevant information of the physical resource, where different coverage enhancement levels are respectively corresponding to relevant information of different physical resources in the correspondence; and determining the acquired coverage enhancement level as a coverage enhancement level that can be supported by the current cell.

With reference to the third possible implementation manner of the second aspect, in a fourth possible implementation manner, the physical resource is a time domain resource, a frequency domain resource, or a code domain resource.

With reference to the second aspect or the first possible implementation manner, in a fifth possible implementation manner, the method further includes:

determining synchronization sequence density of the synchronization sequence;

acquiring, according to a preset correspondence between synchronization sequence density and a coverage enhancement level, a coverage enhancement level corresponding to the determined synchronization sequence density, where different coverage enhancement levels are respectively corresponding to different synchronization sequence density in the correspondence; and determining the acquired coverage enhancement level as a coverage enhancement level that can be supported by the current cell.

With reference to the second aspect or the first possible implementation manner, in a sixth possible implementation manner, the method further includes:

determining that a second indicator bit is carried in the downlink signal, and acquiring a value of the second indicator bit;

selecting, according to a preset correspondence between a coverage enhancement level and a value of a second indicator bit, a coverage enhancement level corresponding to the acquired value of the second indicator bit, where different coverage enhancement levels are respectively corresponding to different values of the second indicator bit in the correspondence; and determining the selected coverage enhancement level as a coverage enhancement level that can be supported by the current cell.

With reference to the second aspect or the first possible implementation manner, in a seventh possible implementation manner, the method further includes:

determining a frequency hopping manner adopted by the downlink signal;

acquiring, according to a preset correspondence between a coverage enhancement level and a frequency hopping manner, a coverage enhancement level corresponding to the determined frequency hopping manner, where different coverage enhancement levels are respectively corresponding to different frequency hopping manners in the correspondence; and determining the acquired coverage enhancement level as a coverage enhancement level that can be supported by the current cell.

With reference to any one of the second possible implementation manner to the seventh possible implementation manner of the second aspect, in an eighth possible implementation manner, the method further includes:

determining a value of strength of the downlink signal;

comparing the value of the strength of the downlink signal with a preset threshold to determine a coverage enhancement level that needs to be supported by the current cell so that the terminal can successfully access the current cell; and if the determined coverage enhancement level that can be supported by the current cell can meet the coverage enhancement level that needs to be supported by the current cell, accessing the current cell; or if the determined coverage enhancement level that can be supported by the current cell cannot meet the coverage enhancement level that needs to be supported by the current cell, selecting another cell for access.

With reference to the eighth possible implementation manner of the second aspect, in a ninth possible implementation manner, comparing the value of the strength of the downlink signal with a preset first threshold and a preset second threshold; and if the value of the strength of the downlink signal is not less than the first threshold, determining that the current cell needs to support a first coverage enhancement level so that the terminal can successfully access the current cell; or if the value of the strength of the downlink signal is greater than or equal to the second threshold and is less than the first threshold, determining that the current cell needs to support a second coverage enhancement level so that the terminal can successfully access the current cell; or if the value of the strength of the downlink signal is not greater than the second threshold, determining that the current cell needs to support a third coverage enhancement level so that the terminal can successfully access the current cell; where coverage enhancement capabilities corresponding to the first coverage enhancement level, the second coverage enhancement level, and the third coverage enhancement level are in ascending order.

With reference to the second aspect, in a tenth possible implementation manner, after determining the terminal type supported by the current cell, the method further includes:

determining whether a terminal type of the terminal belongs to the terminal type supported by the current cell; and if the terminal type of the terminal belongs to the terminal type supported by the current cell, continuing to access the current cell; or if the terminal type of the terminal does not belong to the terminal type supported by the current cell, selecting another cell for access.

According to a third aspect, the present invention provides a base station, including:

a processing module, configured to carry preset indication information in a downlink signal, where the indication information is used to indicate a terminal type supported by a current cell, the preset indication information is agreed upon by a network side and a terminal in advance, and the indication information is a synchronization sequence or a first indicator bit used to indicate the supported terminal type; and a sending module, configured to send the downlink signal processed by the processing module to the terminal.

With reference to the third aspect, in a first possible implementation manner, the processing module is specifically configured to:

carry the synchronization sequence in a predetermined location of the downlink signal.

With reference to the third aspect or the first possible implementation manner, in a second possible implementation manner, the processing module is specifically configured to:

add the synchronization sequence to any location or the predetermined location of the downlink signal.

With reference to any one of the third aspect to the second possible implementation manner, in a third possible implementation manner, the processing module is further configured to:

select, according to a preset correspondence between a coverage enhancement level and a synchronization sequence, the synchronization sequence corresponding to a coverage enhancement level that can be supported by the current cell, where different coverage enhancement levels are respectively corresponding to different synchronization sequences in the correspondence.

With reference to any one of the third aspect to the second possible implementation manner, in a fourth possible implementation manner, the processing module is further configured to:

select, according to a preset correspondence between a coverage enhancement level and relevant information of a physical resource occupied by a synchronization sequence, relevant information that is of a physical resource occupied by the synchronization sequence and that is corresponding to a coverage enhancement level that can be supported by the current cell, where different coverage enhancement levels are respectively corresponding to relevant information of different physical resources in the correspondence, and the relevant information of the physical resource includes type information and location information that are of the physical resource; and determine the physical resource according to the selected relevant information of the physical resource, and carry the synchronization sequence on the physical resource.

With reference to the third aspect or the first possible implementation manner, in a fifth possible implementation manner, the processing module is further configured to:

select, according to a preset correspondence between synchronization sequence density and a coverage enhancement level, synchronization sequence density corresponding to a coverage enhancement level that can be supported by the current cell, where different coverage enhancement levels are respectively corresponding to different synchronization sequence density in the correspondence; and carry, in the downlink signal, the synchronization sequence sorted according to the selected synchronization sequence density.

With reference to the third aspect or the first possible implementation manner, in a sixth possible implementation manner, the processing module is further configured to:

select, according to a preset correspondence between a coverage enhancement level and a value of a second indicator bit, a value that is of a second indicator bit and that is corresponding to a coverage enhancement level that can be supported by the current cell, where different coverage enhancement levels are respectively corresponding to different values of the second indicator bit in the correspondence; and carry the second indicator bit in the downlink signal, where the second indicator bit is set to the selected value of the second indicator bit.

With reference to the third aspect or the first possible implementation manner, in a seventh possible implementation manner, the processing module is further configured to:

select, according to a preset correspondence between a coverage enhancement level and a frequency hopping manner, a frequency hopping manner corresponding to a coverage enhancement level that can be supported by the current cell, where different coverage enhancement levels are respectively corresponding to different frequency hopping manners in the correspondence; and generate the downlink signal according to the selected frequency hopping manner.

With reference to the third aspect, in an eighth possible implementation manner, the terminal type includes a narrowband terminal.

According to a fourth aspect, the present invention provides a terminal, including:

a receiving module, configured to receive a downlink signal sent by a current cell; and a processing module, configured to determine, according to preset indication information carried in the downlink signal received by the receiving module, a terminal type supported by the current cell, where the preset indication information is agreed upon by a network side and the terminal in advance, and the indication information is a synchronization sequence or a first indicator bit used to indicate the supported terminal type.

With reference to the fourth aspect, in a first possible implementation manner, the processing module is specifically configured to:

determine that the synchronization sequence is carried in a predetermined location of the downlink signal.

With reference to the fourth aspect or the first possible implementation manner, in a second possible implementation manner, the processing module is further configured to:

acquire, according to a preset correspondence between a synchronization sequence and a coverage enhancement level, a coverage enhancement level corresponding to the synchronization sequence, where different coverage enhancement levels are respectively corresponding to different synchronization sequences in the correspondence; and determine the acquired coverage enhancement level as a coverage enhancement level that can be supported by the current cell.

With reference to the fourth aspect or the first possible implementation manner, in a third possible implementation manner, the processing module is further configured to:

determine relevant information of a physical resource occupied by the synchronization sequence;

acquire, according to a preset correspondence between a coverage enhancement level and relevant information of a physical resource occupied by a synchronization sequence, a coverage enhancement level corresponding to the determined relevant information of the physical resource, where different coverage enhancement levels are respectively corresponding to relevant information of different physical resources in the correspondence; and determine the acquired coverage enhancement level as a coverage enhancement level that can be supported by the current cell.

With reference to the fourth aspect or the first possible implementation manner, in a fourth possible implementation manner, the processing module is further configured to:

determine synchronization sequence density of the synchronization sequence;

acquire, according to a preset correspondence between synchronization sequence density and a coverage enhancement level, a coverage enhancement level corresponding to the determined synchronization sequence density, where different coverage enhancement levels are respectively corresponding to different synchronization sequence density in the correspondence; and determine the acquired coverage enhancement level as a coverage enhancement level that can be supported by the current cell.

With reference to the fourth aspect or the first possible implementation manner, in a fifth possible implementation manner, the processing module is further configured to:

determine that a second indicator bit is carried in the downlink signal, and acquire a value of the second indicator bit;

select, according to a preset correspondence between a coverage enhancement level and a value of a second indicator bit, a coverage enhancement level corresponding to the acquired value of the second indicator bit, where different coverage enhancement levels are respectively corresponding to different values of the second indicator bit in the correspondence; and determine the selected coverage enhancement level as a coverage enhancement level that can be supported by the current cell.

With reference to the fourth aspect or the first possible implementation manner, in a sixth possible implementation manner, the processing module is further configured to:

determine a frequency hopping manner adopted by the downlink signal;

acquire, according to a preset correspondence between a coverage enhancement level and a frequency hopping manner, a coverage enhancement level corresponding to the determined frequency hopping manner, where different coverage enhancement levels are respectively corresponding to different frequency hopping manners in the correspondence; and determine the acquired coverage enhancement level as a coverage enhancement level that can be supported by the current cell.

With reference to any one of the second possible implementation manner to the sixth possible implementation manner of the fourth aspect, in a seventh possible implementation manner, the processing module is further configured to:

determine a value of strength of the downlink signal;

compare the value of the strength of the downlink signal with a preset threshold to determine a coverage enhancement level that needs to be supported by the current cell so that the terminal can successfully access the current cell; and if the determined coverage enhancement level that can be supported by the current cell can meet the coverage enhancement level that needs to be supported by the current cell, access the current cell; or if the determined coverage enhancement level that can be supported by the current cell cannot meet the coverage enhancement level that needs to be supported by the current cell, select another cell for access.

With reference to the seventh possible implementation manner of the fourth aspect, in an eighth possible implementation manner, the processing module is specifically configured to:

compare the value of the strength of the downlink signal with a preset first threshold and a preset second threshold; and if the value of the strength of the downlink signal is not less than the first threshold, determine that the current cell needs to support a first coverage enhancement level so that the terminal can successfully access the current cell; or if the value of the strength of the downlink signal is greater than or equal to the second threshold and is less than the first threshold, determine that the current cell needs to support a second coverage enhancement level so that the terminal can successfully access the current cell; or if the value of the strength of the downlink signal is not greater than the second threshold, determine that the current cell needs to support a third coverage enhancement level so that the terminal can successfully access the current cell; where coverage enhancement capabilities corresponding to the first coverage enhancement level, the second coverage enhancement level, and the third coverage enhancement level are in ascending order.

With reference to the fourth aspect, in a ninth possible implementation manner, the processing module is further configured to:

determine whether a terminal type of the terminal belongs to the terminal type supported by the current cell; where if the terminal type of the terminal belongs to the terminal type supported by the current cell, the terminal continues to access the current cell; or if the terminal type of the terminal does not belong to the terminal type supported by the current cell, the terminal selects another cell for access.

Based on the foregoing technical solutions, in the embodiments of the present invention, preset indication information is carried in a downlink signal, where the indication information may be a synchronization sequence or a first indicator bit used to indicate a supported terminal type. The indication information indicates the terminal type supported by a current cell, which overcomes a disadvantage in the prior art that a terminal cannot quickly learn a terminal type supported by a network, so that after receiving the downlink signal, the terminal may quickly learn, according to the preset indication information carried in the downlink signal, the terminal type supported by the current cell.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A method, a device, and a system that are involved in the following embodiments may be applied to any type of terminal.

In the following embodiments, that the terminal type includes a narrowband terminal is merely used as an example for description, and the embodiments are not limited thereto. In an actual application, there may be one or more terminal types supported by a current cell, and the one or more terminal types only need to be agreed upon by a network side and a terminal. For specific implementation of the one or more methods, refer to the following embodiments.

The narrowband terminal mentioned in the following embodiments has at least a feature of supporting narrower bandwidth. In addition, the narrowband terminal has a higher requirement on coverage enhancement, and may also have additional features, for example, supports a fewer modulation and coding scheme types, supports a simpler modulation and coding scheme, and has a higher requirement on power saving.

In the following embodiments, notifying that the current cell supports the terminal type, that is, the narrowband terminal, is merely used as an example for description. In the embodiments of the present invention, multiple terminal types supported by the current cell may be notified by using indication information. For a specific implementation process of notifying the multiple terminal types by using the indication information, refer to an implementation process of notifying only one terminal type.

Figure 1:
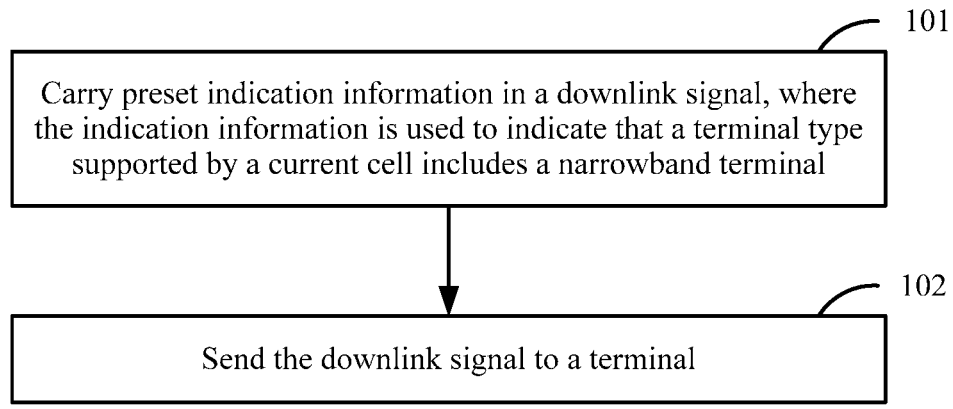
FIG. 1 is a flowchart of a method for notifying that a current cell supports a narrowband UE according to an embodiment of the present invention.

In a first embodiment of the present invention, as shown in FIG. 1, a base station executes the method. A specific process of a method for a network side to notify that a current cell supports a narrowband terminal is as follows:

Step 101: Carry preset indication information in a downlink signal, where the indication information is used to indicate that a terminal type supported by a current cell includes a narrowband terminal, and the preset indication information is agreed upon by a network side and a terminal in advance.

According to different indication information, there may be the following two specific implementation manners:

In a first specific implementation manner, the indication information is a synchronization sequence, that is, a preset synchronization sequence is sent on a synchronization channel to indicate that the current cell supports the narrowband terminal.

In a second specific implementation manner, the indication information is a first indicator bit used to indicate whether the current cell supports the narrowband terminal. Specifically, the downlink signal that carries the first indicator bit may be a system message or a broadcast message.

For example, one bit is set as the first indicator bit of the indication information on a broadcast channel. A value of the bit that is in a Master Information Block (MIB) sent through the broadcast channel and that is carried in a location corresponding to the set one bit is the indication information that indicates whether the current cell supports the narrowband UE. It is assumed that: the value of the bit is set to 0, and it indicates that the current cell does not support the narrowband UE; or the value of the bit is set to 1, and it indicates that the current cell supports the narrowband UE.

For the first specific implementation manner, there are the following two specific implementation manners for carrying the indication information by using the synchronization sequence in the downlink signal:

In a first specific implementation manner, a composition of the downlink signal is changed; some integral parts of the downlink signal are replaced by the synchronization sequence, and the synchronization sequence is carried on an existing physical resource for sending.

In a second specific implementation manner, a composition of the existing downlink signal remains unchanged; the synchronization sequence is added to any location or a predetermined location of the downlink signal; a new physical resource is allocated to the synchronization sequence, and the synchronization sequence is carried on the new physical resource for sending.

The existing physical resource or the newly added physical resource occupied by the synchronization sequence may be any one of a time domain resource, a frequency domain resource, or a code domain resource.

For the first specific implementation manner, according to a location for carrying the synchronization sequence, there may be the following two implementation manners for carrying the synchronization sequence in the downlink signal:

In a first implementation manner, the synchronization sequence is carried in a predetermined location of the downlink signal, that is, a location of the synchronization sequence in the downlink signal is fixed.

In a second implementation manner, a location of the synchronization sequence in the downlink signal is not fixed, and it is only required that the synchronization sequence is carried in the downlink signal.

Step 102: Send the downlink signal to the terminal.

Preferably, corresponding configuration is performed on the narrowband UE according to a configuration policy on the network side. After receiving the downlink signal, the narrowband UE detects, according to a pre-configured policy, whether the indication information is carried in the downlink signal, and determines, according to the indication information, whether the current cell supports the narrowband UE.

In a specific implementation process, a terminal that receives the downlink signal may be of any type, that is, a meaning of the indication information is agreed upon by the network side and any terminal, so that the terminal of any type can receive the downlink signal and learn, according to the downlink signal, that the current cell supports the narrowband UE; or only the narrowband UE can successfully receive and parse the downlink signal, that is, a meaning of the indication information is agreed upon only by the network side and the narrowband terminal, so that a non-narrowband UE cannot receive the downlink signal, or can receive the downlink signal but then discards the downlink signal after parsing fails.

Figure 2:
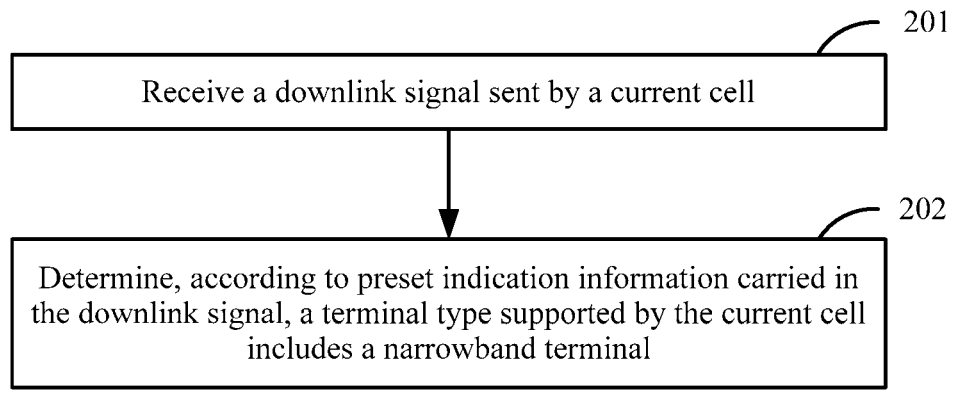
FIG. 2 is a flowchart of a method for notifying that a current cell supports a narrowband UE according to another embodiment of the present invention.

In a second embodiment of the present invention, as shown in FIG. 2, a narrowband UE is used as an execution body. A specific process of a method for notifying that a current cell supports the narrowband UE is described below. It should be noted that only that the execution body is the narrowband UE is used as an example for description herein. In this embodiment, the execution body may be a UE of any type, and the UE may learn, from the following process, a terminal type supported by the current cell.

Step 201: Receive a downlink signal sent by a current cell.

Step 202: Determine, according to preset indication information carried in the downlink signal, that a terminal type supported by the current cell includes a narrowband terminal, where the preset indication information is agreed upon by a network side and a terminal in advance.

In a specific implementation process, after determining the terminal type supported by the current cell, the UE of any type determines whether a terminal type of the UE of any type belongs to the terminal type supported by the current cell. If the terminal type of the UE belongs to the terminal type supported by the current cell, the UE continues to access the current cell; or if the terminal type of the UE does not belong to the terminal type supported by the current cell, the UE selects another cell for access.

Specifically, according to a configuration on the network side, the preset indication information is a synchronization sequence or a first indicator bit used to indicate whether the current cell supports the narrowband terminal.

Specifically, according to the configuration on the network side, if the synchronization sequence is fixed at a predetermined location of the downlink signal, after receiving the downlink signal, the narrowband UE determines that the synchronization sequence is carried in the predetermined location of the downlink signal, and then determines that the terminal type supported by the current cell includes the narrowband UE.

For the foregoing first embodiment and second embodiment, further, if coverage of the cell needs to be enhanced, when that the current cell supports the narrowband UE is notified or after that the current cell supports the narrowband UE is notified, a coverage enhancement level that can be supported by the current cell needs to be notified. Specifically, there may be the following several implementation manners for notifying the coverage enhancement level that can be supported by the current cell:

In a first implementation manner, a correspondence between a coverage enhancement level of the cell and a synchronization sequence is pre-configured on the network side, where different coverage enhancement levels are respectively corresponding to different synchronization sequences; and the correspondence may be pre-configured in the current cell of a base station, or may be configured on another network device on the network side, and the network device sends the correspondence configured for the current cell to the base station.

The base station notifies, by using the synchronization sequence, that the current cell supports the narrowband UE, and also notifies, by using the synchronization sequence, the coverage enhancement level that can be supported by the current cell, which is specifically as follows:

A specific process of carrying the synchronization sequence in the downlink signal according to the pre-configured correspondence is:

selecting, according to the preset correspondence between the coverage enhancement level and the synchronization sequence, the synchronization sequence corresponding to the coverage enhancement level that can be supported by the current cell, where different coverage enhancement levels are respectively corresponding to different synchronization sequences in the correspondence; and carrying the selected synchronization sequence in the downlink signal.

Accordingly, on the terminal side, that is, on the narrowband UE, the correspondence between the coverage enhancement level of the cell and the synchronization sequence is pre-configured according to a configuration policy on the network side, where different coverage enhancement levels are respectively corresponding to different synchronization sequences; and the correspondence may be sent by the network device to the narrowband UE, or may be pre-configured on the narrowband UE.

After receiving the downlink signal, the narrowband UE determines that the current cell supports the narrowband UE, and also determines the coverage enhancement level of the current cell, which is specifically as follows:

acquiring, according to the preset correspondence between the synchronization sequence and the coverage enhancement level, the coverage enhancement level corresponding to the synchronization sequence carried in the downlink signal, where different coverage enhancement levels are corresponding to different synchronization sequences in the correspondence; and determining the acquired coverage enhancement level as the coverage enhancement level that can be supported by the current cell.

For example, the synchronization sequences are divided into three categories (categories A, B, and C) in preset configuration information, and synchronization sequences of the categories are corresponding to different coverage enhancement levels. It is assumed that coverage enhancement levels corresponding to synchronization sequences of categories A, B, and C are in ascending order. When the synchronization sequence carried in the downlink signal received by the UE belongs to category A, the UE determines that the coverage enhancement level that can be supported by the current cell is 1 transmission; or when the synchronization sequence carried in the downlink signal received by the UE belongs to category B, the UE determines that the coverage enhancement levels that can be supported by the current cell are 1 transmission and 8 transmissions; or when the synchronization sequence carried in the downlink signal received by the UE belongs to category C, the UE determines that the coverage enhancement levels that can be supported by the current cell are 1 transmission, 8 transmissions, and 64 transmissions.

In a second implementation manner, a correspondence between a coverage enhancement level of the cell and relevant information of a physical resource occupied by a synchronization sequence is pre-configured on the network side, where relevant information that is of physical resources and that is corresponding to different coverage enhancement levels is different; and the correspondence may be pre-configured in the current cell of a base station, or may be configured on another network device on the network side, and the network device sends the correspondence configured for the current cell to the base station.

The base station notifies, by using the synchronization sequence, that the current cell supports the narrowband UE, and also notifies, by using the synchronization sequence, the coverage enhancement level that can be supported by the current cell, which is specifically as follows:

selecting, according to the preset correspondence between the coverage enhancement level and the relevant information of the physical resource occupied by the synchronization sequence, relevant information that is of a physical resource occupied by the synchronization sequence and that is corresponding to the coverage enhancement level that can be supported by the current cell, where different coverage enhancement levels are respectively corresponding to relevant information of different physical resources in the correspondence; and determining the physical resource according to the selected relevant information of the physical resource, and carrying the synchronization sequence on the physical resource.

The relevant information of the physical resource includes at least type information and location information that are of the physical resource, that is, the least information that can be used to uniquely determine the physical resource.

The physical resource is a time domain resource, a frequency domain resource, or a code domain resource.

The determined physical resource may be a part of original physical resources used to carry the downlink signal, or may be a physical resource that is newly added based on original physical resources used to carry the downlink signal.

Accordingly, on the terminal side, that is, on the narrowband UE, the correspondence between the coverage enhancement level of the cell and the relevant information of the physical resource occupied by the synchronization sequence is pre-configured according to a configuration policy on the network side, where different coverage enhancement levels are respectively corresponding to relevant information of different physical resources; and the correspondence may be sent by the network device to the narrowband UE, or may be pre-configured on the narrowband UE.

After receiving the downlink signal, the narrowband UE determines that the current cell supports the narrowband UE, and also determines the coverage enhancement level of the current cell, which is specifically as follows:

determining the relevant information of the physical resource occupied by the synchronization sequence carried in the downlink signal;

acquiring, according to the preset correspondence between the coverage enhancement level and the relevant information of the physical resource occupied by the synchronization sequence, the coverage enhancement level corresponding to the determined relevant information of the physical resource, where different coverage enhancement levels are respectively corresponding to relevant information of different physical resources in the correspondence; and determining the acquired coverage enhancement level as the coverage enhancement level that can be supported by the current cell.

In a specific implementation process, when the correspondence between the coverage enhancement level of the cell and the relevant information of the physical resource occupied by the synchronization sequence is pre-configured, a correspondence between a coverage enhancement level and a synchronization sequence may be preset; that is, synchronization sequences corresponding to different coverage enhancement levels are different, and relevant information of physical resources occupied by the synchronization sequences corresponding to different coverage enhancement levels is different.

For example, corresponding to coverage enhancement level 1, it may be set that corresponding synchronization sequences belong to synchronization sequence set 1 and that physical resources occupied by the synchronization sequences belong to physical resource set 1; corresponding to coverage enhancement levels 1 and 2, it may be set that corresponding synchronization sequences belong to synchronization sequence set 2 and that physical resources occupied by the synchronization sequences belong to physical resource set 2; and corresponding to coverage enhancement levels 1, 2, and 3, it may be set that corresponding synchronization sequences belong to synchronization sequence set 3 and that physical resources occupied by the synchronization sequences belong to physical resource set 3.

In a third implementation manner, a correspondence between a coverage enhancement level of the cell and synchronization sequence density is pre-configured on the network side, where different coverage enhancement levels are corresponding to different synchronization sequence density; and the correspondence may be pre-configured in the current cell of a base station, or may be configured on another network device on the network side, and the network device sends the correspondence configured for the current cell to the base station.

The base station notifies, by using the synchronization sequence, that the current cell supports the narrowband UE, and also notifies, by using the synchronization sequence, the coverage enhancement level that can be supported by the current cell, which is specifically as follows:

selecting, according to the preset correspondence between the synchronization sequence density and the coverage enhancement level, synchronization sequence density corresponding to the coverage enhancement level that can be supported by the current cell, where different coverage enhancement levels are respectively corresponding to different synchronization sequence density in the correspondence; and carrying, in the downlink signal, the synchronization sequence sorted according to the selected synchronization sequence density.

In a preferred implementation manner, it may be set that a higher coverage enhancement level is corresponding to higher synchronization sequence density.

Accordingly, on the terminal side, that is, on the narrowband UE, the correspondence between the coverage enhancement level of the cell and the synchronization sequence density is pre-configured according to a configuration policy on the network side, where different coverage enhancement levels are corresponding to different synchronization sequence density; and the correspondence may be sent by the network device to the narrowband UE, or may be pre-configured on the narrowband UE.

After receiving the downlink signal, the narrowband UE determines that the current cell supports the narrowband UE, and also determines the coverage enhancement level of the current cell, which is specifically as follows:

determining the synchronization sequence density of the synchronization sequence carried in the downlink signal;

acquiring, according to the preset correspondence between the synchronization sequence density and the coverage enhancement level, the coverage enhancement level corresponding to the determined synchronization sequence density, where different coverage enhancement levels are respectively corresponding to different synchronization sequence density in the correspondence; and determining the acquired coverage enhancement level as the coverage enhancement level that can be supported by the current cell.

In the first to the third implementation manners, the synchronization sequence is used to indicate that the current cell supports the narrowband UE, and the synchronization sequence is also used to indicate the coverage enhancement level that can be supported by the current cell.

In a fourth implementation manner and a fifth implementation manner that are provided below, the synchronization sequence may be carried in the downlink signal to notify that the current cell supports the narrowband UE, or the first indicator bit may be carried in the downlink signal to notify that the current cell supports the narrowband UE; and the coverage enhancement level that can be supported by the current cell is notified in another manner.

In the fourth implementation manner, a correspondence between a coverage enhancement level of the cell and a value of a second indicator bit is pre-configured on the network side, where different coverage enhancement levels are corresponding to different values of the second indicator bit; and the correspondence may be pre-configured in the current cell of a base station, or may be configured on another network device on the network side, and the network device sends the correspondence configured for the current cell to the base station.

When the preset indication information is carried in the downlink signal to notify that the current cell supports the narrowband UE, the base station further includes:

selecting, according to the preset correspondence between the coverage enhancement level and the value of the second indicator bit, a value that is of a second indicator bit and that is corresponding to the coverage enhancement level that can be supported by the current cell, where different coverage enhancement levels are respectively corresponding to different values of the second indicator bit in the correspondence; and carrying the second indicator bit in the downlink signal, where the second indicator bit is set to the selected value of the second indicator bit.

Accordingly, on the terminal side, that is, on the narrowband UE, the correspondence between the coverage enhancement level of the cell and the value of the second indicator bit is pre-configured according to a configuration policy on the network side, where different coverage enhancement levels are respectively corresponding to different values of the second indicator bit; and the correspondence may be sent by the network device to the narrowband UE, or may be pre-configured on the narrowband UE.

After receiving the downlink signal, the narrowband UE determines that the current cell supports the narrowband UE, and also determines the coverage enhancement level of the current cell, which is specifically as follows:

determining that the second indicator bit is carried in the downlink signal, and acquiring the value of the second indicator bit;

selecting, according to the preset correspondence between the coverage enhancement level and the value of the second indicator bit, the coverage enhancement level corresponding to the acquired value of the second indicator bit, where different coverage enhancement levels are respectively corresponding to different values of the second indicator bit in the correspondence; and determining the acquired coverage enhancement level as the coverage enhancement level that can be supported by the current cell.

In the fifth implementation manner, a correspondence between a coverage enhancement level of the cell and a frequency hopping manner is pre-configured on the network side, where different coverage enhancement levels are corresponding to different frequency hopping manners; and the correspondence may be pre-configured in the current cell of a base station, or may be configured on another network device on the network side, and the network device sends the correspondence configured for the current cell to the base station.

When the preset indication information is carried in the downlink signal to notify that the current cell supports the narrowband UE, the base station further includes:

selecting, according to the preset correspondence between the coverage enhancement level and the frequency hopping manner, a frequency hopping manner corresponding to the coverage enhancement level that can be supported by the current cell, where different coverage enhancement levels are respectively corresponding to different frequency hopping manners in the correspondence; and generating the downlink signal according to the selected frequency hopping manner.

Accordingly, on the terminal side, that is, on the narrowband UE, the correspondence between the coverage enhancement level of the cell and the frequency hopping manner is pre-configured according to a configuration policy on the network side, where different coverage enhancement levels are respectively corresponding to different frequency hopping manners; and the correspondence may be sent by the network device to the narrowband UE, or may be pre-configured on the narrowband UE.

After receiving the downlink signal, the narrowband UE determines that the current cell supports the narrowband UE, and also determines the coverage enhancement level of the current cell, which is specifically as follows:

determining the frequency hopping manner adopted by the downlink signal;

acquiring, according to the preset correspondence between the coverage enhancement level and the frequency hopping manner, the coverage enhancement level corresponding to the determined frequency hopping manner, where different coverage enhancement levels are respectively corresponding to different frequency hopping manners in the correspondence; and determining the acquired coverage enhancement level as the coverage enhancement level that can be supported by the current cell.

Preferably, in the second embodiment, after the terminal side determines the coverage enhancement level that can be supported by the current cell, the method further includes:

determining a value of strength of the downlink signal;

comparing the value of the strength of the downlink signal with a preset threshold to determine a coverage enhancement level that needs to be supported by the current cell so that the narrowband terminal can successfully access the current cell; and if the determined coverage enhancement level that can be supported by the current cell can meet the coverage enhancement level that needs to be supported by the current cell, accessing the current cell; or if the determined coverage enhancement level that can be supported by the current cell cannot meet the coverage enhancement level that needs to be supported by the current cell, selecting another cell for access.

In a specific implementation process, when the terminal side compares the value of the strength of the downlink signal with the preset threshold, a quantity and values that are of the preset thresholds are determined according to a level of the coverage enhancement level.

Preferably, the quantity of the preset thresholds is the level of the coverage enhancement level minus one, and the value of the preset threshold is a strength value of the corresponding downlink signal when the current cell is in a critical state of the coverage enhancement level.

Comparing the value of the strength of the downlink signal with the preset threshold is specifically as follows:

The value of the strength of the downlink signal is sequentially compared with each threshold according to a value of each preset threshold to determine a range to which the value of the strength of the downlink signal belongs and that is divided according to each threshold. A coverage enhancement level corresponding to the range is the coverage enhancement level that needs to be supported by the current cell so that the narrowband terminal can successfully access the current cell.

That the level of the coverage enhancement level is 3 is used as an example, and there are two preset thresholds. A specific process of comparing, by the terminal side, the value of the strength of the downlink signal with the preset threshold to determine the coverage enhancement level that needs to be supported by the current cell so that the narrowband terminal can successfully access the current cell is as follows: comparing the value of the strength of the downlink signal with a preset first threshold and a preset second threshold; and if the value of the strength of the downlink signal is not less than the first threshold, determining that the current cell needs to support a first coverage enhancement level so that the narrowband terminal can successfully access the current cell; or if the value of the strength of the downlink signal is greater than or equal to the second threshold and is less than the first threshold, determining that the current cell needs to support a second coverage enhancement level so that the narrowband terminal can successfully access the current cell; or if the value of the strength of the downlink signal is not greater than the second threshold, determining that the current cell needs to support a third coverage enhancement level so that the narrowband terminal can successfully access the current cell.

Coverage enhancement capabilities corresponding to the first coverage enhancement level, the second coverage enhancement level, and the third coverage enhancement level are in ascending order.

The first threshold is a strength value of the downlink signal when the current cell is in a critical state between the first coverage enhancement level and the second coverage enhancement level. The second threshold is a strength value of the downlink signal when the current cell is in a critical state between the second coverage enhancement level and the third coverage enhancement level.

The value of the strength of the downlink signal may be determined according to reference signal received power or synchronization signal power, which is merely exemplary, and the present invention is not limited thereto.

For example, it is assumed that coverage enhancement is divided into three levels: coverage enhancement level 1, coverage enhancement level 2, and coverage enhancement level 3 respectively, and coverage enhancement capabilities are in ascending order according to the sequence; the preset thresholds are P1 and P2, where P1 is greater than P2. A specific process of determining is as follows:

when the strength of the downlink signal P is greater than or equal to P1, it indicates that the current cell needs to support the coverage enhancement level 1 so that the UE can access the current cell;

when the strength of the downlink signal P is greater than or equal to P2 and is less than P1, it indicates that the current cell needs to support the coverage enhancement level 2 so that the UE can access the current cell; or when the strength of the downlink signal P is greater than P2, it indicates that the current cell needs to support the coverage enhancement level 3 so that the UE can access the current cell.

According to a result of the determining, if the current cell needs to support the coverage enhancement level 3 so that the UE can access the current cell, but the current cell actually supports the coverage enhancement level 2, it is determined that the UE cannot access the current cell, and the UE needs to select another cell for access and camp-on; or according to a result of the determining, if the current cell needs to support the coverage enhancement level 2 so that the UE can access the current cell, but the current cell actually supports the coverage enhancement level 1, it is determined that the UE cannot access the current cell, and the UE needs to select another cell for access and camp-on; or according to a result of the determining, if the current cell needs to support the coverage enhancement level 1 so that the UE can access the current cell, but the current cell actually supports the coverage enhancement level 2, it is determined that the UE can access the current cell, and the UE selects the current cell for access and camp-on.

Figure 3:
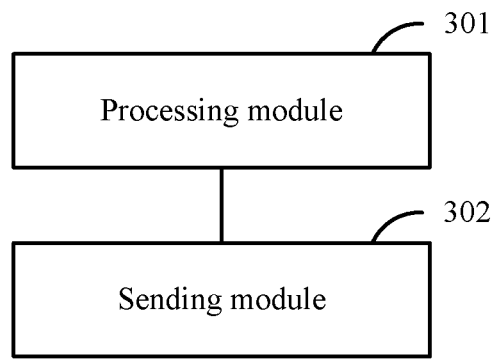
FIG. 3 is a schematic structural diagram of a base station according to another embodiment of the present invention.

In a third embodiment, as shown in FIG. 3, a base station is provided to execute the method shown in the foregoing FIG. 1. For specific implementation of the base station, refer to descriptions in the foregoing first embodiment, and no repeated description is provided. The base station mainly includes:

a processing module 301, configured to carry preset indication information in a downlink signal, where the indication information is used to indicate that a current cell supports a narrowband terminal; and a sending module 302, configured to send the downlink signal processed by the processing module 301 to a terminal.

In a specific implementation process, the indication information is a synchronization sequence or a first indicator bit used to indicate whether the current cell supports the narrowband terminal.

Specifically, when the indication information is the synchronization sequence, according to a location for carrying the synchronization sequence, there may be the following two implementation manners:

In a first implementation manner, the synchronization sequence is carried in a predetermined location of the downlink signal, that is, a location of the synchronization sequence in the downlink signal is fixed.

In a second implementation manner, a location of the synchronization sequence in the downlink signal is not fixed, and it is only required that the synchronization sequence is carried in the downlink signal.

Preferably, the processing module is specifically configured to:

carry the synchronization sequence in a predetermined location of the downlink signal.

When the indication information is the synchronization sequence, there may be the following two specific implementation manners for carrying the synchronization sequence in the downlink signal:

In a first specific implementation manner, a composition of the downlink signal is changed; some integral parts of the downlink signal are replaced by the synchronization sequence, and the synchronization sequence is carried on an existing physical resource for sending.

In a second specific implementation manner, a composition of the existing downlink signal remains unchanged; the synchronization sequence is added to any location or the predetermined location of the downlink signal; a new physical resource is allocated to the synchronization sequence, and the synchronization sequence is carried on the new physical resource for sending.

The existing physical resource or the newly added physical resource occupied by the synchronization sequence may be any one of a time domain resource, a frequency domain resource, or a code domain resource.

For the second implementation manner, the processing module is specifically configured to:

add the synchronization sequence to the downlink signal, where the synchronization sequence occupies the newly added physical resource.

If coverage of the cell needs to be enhanced, a coverage enhancement level that can be supported by the current cell needs to be notified, and there are the following several specific implementation manners:

In a first implementation manner, the processing module is further configured to:

select, according to a preset correspondence between a coverage enhancement level and a synchronization sequence, the synchronization sequence corresponding to the coverage enhancement level that can be supported by the current cell, where different coverage enhancement levels are respectively corresponding to different synchronization sequences in the correspondence.

In a second implementation manner, the processing module is further configured to:

select, according to a preset correspondence between a coverage enhancement level and relevant information of a physical resource occupied by a synchronization sequence, relevant information that is of a physical resource occupied by the synchronization sequence and that is corresponding to the coverage enhancement level that can be supported by the current cell, where different coverage enhancement levels are respectively corresponding to relevant information of different physical resources in the correspondence; and determine the physical resource according to the selected relevant information of the physical resource, and carry the synchronization sequence on the physical resource.

In a third implementation manner, the processing module is further configured to:

select, according to a preset correspondence between synchronization sequence density and a coverage enhancement level, synchronization sequence density corresponding to the coverage enhancement level that can be supported by the current cell, where different coverage enhancement levels are respectively corresponding to different synchronization sequence density in the correspondence; and carry, in the downlink signal, the synchronization sequence sorted according to the selected synchronization sequence density.

In a fourth implementation manner, the processing module is further configured to:

select, according to a preset correspondence between a coverage enhancement level and a value of a second indicator bit, a value that is of a second indicator bit and that is corresponding to the coverage enhancement level that can be supported by the current cell, where different coverage enhancement levels are respectively corresponding to different values of the second indicator bit in the correspondence; and carry the second indicator bit in the downlink signal, where the second indicator bit is set to the selected value of the second indicator bit.

In a fifth implementation manner, the processing module is further configured to:

select, according to a preset correspondence between a coverage enhancement level and a frequency hopping manner, a frequency hopping manner corresponding to the coverage enhancement level that can be supported by the current cell, where different coverage enhancement levels are respectively corresponding to different frequency hopping manners in the correspondence; and generate the downlink signal according to the selected frequency hopping manner.

Figure 4:
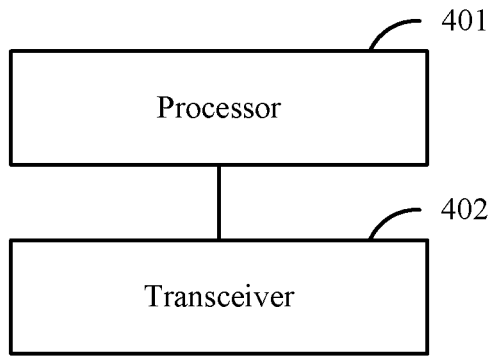
FIG. 4 is a schematic structural diagram of a base station according to another embodiment of the present invention.

In addition to the structure of the base station described in the third embodiment, in a fourth embodiment, as shown in FIG. 4, a base station of another structure is further provided to execute the method shown in the foregoing FIG. 1. For an implementation principle of the base station, refer to descriptions in the foregoing first embodiment, and no repeated description is provided. The base station mainly includes a processor 401 and a transceiver 402.

The processor 401 is configured to carry preset indication information in a downlink signal, where the indication information is used to indicate that a current cell supports a narrowband terminal.

The transceiver 402 is configured to send the downlink signal processed by the processor 401 to the narrowband terminal.

The indication information is a synchronization sequence or a first indicator bit used to indicate whether the current cell supports the narrowband terminal.

Preferably, the processor 401 is specifically configured to:

carry the synchronization sequence in a predetermined location of the downlink signal.

In a specific implementation process, the processor 401 is specifically configured to add the synchronization sequence to any location or the predetermined location of the downlink signal, where the synchronization sequence occupies a newly added physical resource.

The physical resource is a time domain resource, a frequency domain resource, or a code domain resource.

If coverage of the cell needs to be enhanced, a coverage enhancement level that can be supported by the current cell needs to be notified, and there are the following several specific implementation manners:

In a first specific implementation manner, the processor 401 is further configured to:

select, according to a preset correspondence between a coverage enhancement level and a synchronization sequence, the synchronization sequence corresponding to the coverage enhancement level that can be supported by the current cell, where different coverage enhancement levels are respectively corresponding to different synchronization sequences in the correspondence.

In a second specific implementation manner, the processor 401 is further configured to:

select, according to a preset correspondence between a coverage enhancement level and relevant information of a physical resource occupied by a synchronization sequence, relevant information that is of a physical resource occupied by the synchronization sequence and that is corresponding to the coverage enhancement level that can be supported by the current cell, where different coverage enhancement levels are respectively corresponding to relevant information of different physical resources in the correspondence; and determine the physical resource according to the selected relevant information of the physical resource, and carry the synchronization sequence on the physical resource.

In a third specific implementation manner, the processor 401 is further configured to:

select, according to a preset correspondence between synchronization sequence density and a coverage enhancement level, synchronization sequence density corresponding to the coverage enhancement level that can be supported by the current cell, where different coverage enhancement levels are respectively corresponding to different synchronization sequence density in the correspondence; and carry, in the downlink signal, the synchronization sequence sorted according to the selected synchronization sequence density.

In a fourth specific implementation manner, the processor 401 is further configured to:

select, according to a preset correspondence between a coverage enhancement level and a value of a second indicator bit, a value that is of a second indicator bit and that is corresponding to the coverage enhancement level that can be supported by the current cell, where different coverage enhancement levels are respectively corresponding to different values of the second indicator bit in the correspondence; and carry the second indicator bit in the downlink signal, where the second indicator bit is set to the selected value of the second indicator bit.

In a fifth specific implementation manner, the processor 401 is further configured to:

select, according to a preset correspondence between a coverage enhancement level and a frequency hopping manner, a frequency hopping manner corresponding to the coverage enhancement level that can be supported by the current cell, where different coverage enhancement levels are respectively corresponding to different frequency hopping manners in the correspondence; and generate the downlink signal according to the selected frequency hopping manner.

Figure 5:
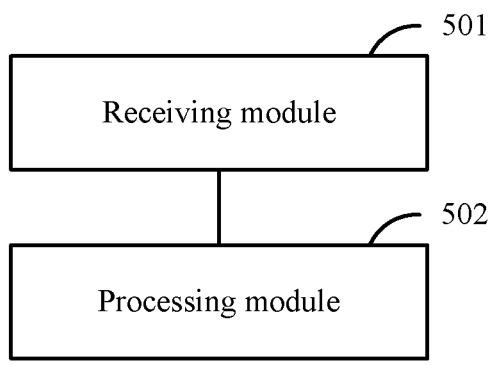
FIG. 5 is a schematic structural diagram of a UE according to another embodiment of the present invention.

In a fifth embodiment, as shown in FIG. 5, a UE is further provided to execute the method shown in the foregoing FIG. 2. For specific implementation of the UE, refer to descriptions in the foregoing second embodiment, and no repeated description is provided. The UE mainly includes:

a receiving module 501, configured to receive a downlink signal sent by a current cell; and a processing module 502, configured to determine, according to preset indication information carried in the downlink signal received by the receiving module 501, that a terminal type supported by the current cell includes a narrowband terminal.

The processing module is further configured to: after determining the terminal type supported by the current cell, determine whether a terminal type of the terminal belongs to the terminal type supported by the current cell. If the terminal type of the terminal belongs to the terminal type supported by the current cell, the terminal continues to access the current cell; or if the terminal type of the terminal does not belong to the terminal type supported by the current cell, the terminal selects another cell for access.

The indication information is a synchronization sequence or a first indicator bit used to indicate whether the current cell supports the narrowband terminal.

Preferably, according to a configuration on a network side, the processing module is specifically configured to:

determine that the synchronization sequence is carried in a predetermined location of the downlink signal.

If coverage of the cell needs to be enhanced, a coverage enhancement level that can be supported by the current cell needs to be notified. Corresponding to configurations on the network side, and there are the following several specific implementation manners:

In a first specific implementation manner, the processing module is further configured to:

acquire, according to a preset correspondence between a synchronization sequence and a coverage enhancement level, the coverage enhancement level corresponding to the synchronization sequence, where different coverage enhancement levels are respectively corresponding to different synchronization sequences in the correspondence; and determine the acquired coverage enhancement level as the coverage enhancement level that can be supported by the current cell.

In a second specific implementation manner, the processing module is further configured to:

determine relevant information of a physical resource occupied by the synchronization sequence;

acquire, according to a preset correspondence between a coverage enhancement level and relevant information of a physical resource occupied by a synchronization sequence, the coverage enhancement level corresponding to the determined relevant information of the physical resource, where different coverage enhancement levels are respectively corresponding to relevant information of different physical resources in the correspondence; and determine the acquired coverage enhancement level as the coverage enhancement level that can be supported by the current cell.

Corresponding to the configuration on the network side, the physical resource is a time domain resource, a frequency domain resource, or a code domain resource.

In a third specific implementation manner, the processing module is further configured to:

determine synchronization sequence density of the synchronization sequence;

acquire, according to a preset correspondence between synchronization sequence density and a coverage enhancement level, the coverage enhancement level corresponding to the determined synchronization sequence density, where different coverage enhancement levels are respectively corresponding to different synchronization sequence density in the correspondence; and determine the acquired coverage enhancement level as the coverage enhancement level that can be supported by the current cell.

In a fourth specific implementation manner, the processing module is further configured to:

determine that a second indicator bit is carried in the downlink signal, and acquire a value of the second indicator bit;

select, according to a preset correspondence between a coverage enhancement level and a value of a second indicator bit, the coverage enhancement level corresponding to the acquired value of the second indicator bit, where different coverage enhancement levels are respectively corresponding to different values of the second indicator bit in the correspondence; and determine the selected coverage enhancement level as the coverage enhancement level that can be supported by the current cell.

In a fifth specific implementation manner, the processing module is further configured to:

determine a frequency hopping manner adopted by the downlink signal;

acquire, according to a preset correspondence between a coverage enhancement level and a frequency hopping manner, the coverage enhancement level corresponding to the determined frequency hopping manner, where different coverage enhancement levels are respectively corresponding to different frequency hopping manners in the correspondence; and determine the acquired coverage enhancement level as the coverage enhancement level that can be supported by the current cell.

Preferably, the processing module is further configured to:

determine a value of strength of the downlink signal;

compare the value of the strength of the downlink signal with a preset threshold to determine a coverage enhancement level that needs to be supported by the current cell so that the narrowband terminal can successfully access the current cell; and if the determined coverage enhancement level that can be supported by the current cell can meet the coverage enhancement level that needs to be supported by the current cell, access the current cell; or if the determined coverage enhancement level that can be supported by the current cell cannot meet the coverage enhancement level that needs to be supported by the current cell, select another cell for access.

The processing module is specifically configured to:

compare the value of the strength of the downlink signal with a preset first threshold and a preset second threshold; and if the value of the strength of the downlink signal is not less than the first threshold, determine that the current cell needs to support a first coverage enhancement level so that the narrowband terminal can successfully access the current cell; or if the value of the strength of the downlink signal is greater than or equal to the second threshold and is less than the first threshold, determine that the current cell needs to support a second coverage enhancement level so that the narrowband terminal can successfully access the current cell; or if the value of the strength of the downlink signal is not greater than the second threshold, determine that the current cell needs to support a third coverage enhancement level so that the narrowband terminal can successfully access the current cell.

Coverage enhancement capabilities corresponding to the first coverage enhancement level, the second coverage enhancement level, and the third coverage enhancement level are in ascending order.

Figure 6:
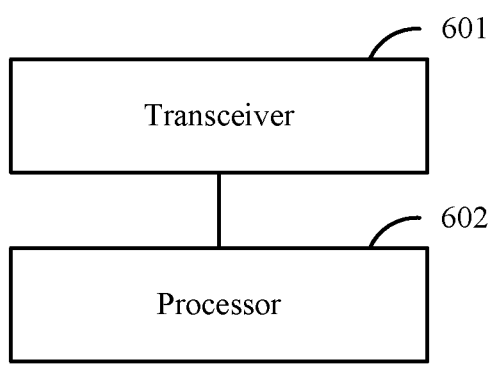
FIG. 6 is a schematic structural diagram of a UE according to another embodiment of the present invention.

In addition to the structure of the UE provided in the fifth embodiment of the present invention, in a sixth embodiment of the present invention, as shown in FIG. 6, a UE of another structure is further provided to execute the method shown in the foregoing FIG. 2. For a specific implementation principle of the UE, refer to descriptions in the foregoing second embodiment, and no repeated description is provided. The UE mainly includes a transceiver 601 and a processor 602.

The transceiver 601 is configured to receive a downlink signal sent by a current cell.

The processor 602 is configured to determine, according to preset indication information carried in the downlink signal received by the transceiver 601, that a terminal type supported by the current cell includes a narrowband terminal.

The processor is further configured to: after determining the terminal type supported by the current cell, determine whether a terminal type of the terminal belongs to the terminal type supported by the current cell. If the terminal type of the terminal belongs to the terminal type supported by the current cell, the terminal continues to access the current cell; or if the terminal type of the terminal does not belong to the terminal type supported by the current cell, the terminal selects another cell for access.

The indication information is a synchronization sequence or a first indicator bit used to indicate whether the current cell supports the narrowband terminal.

Preferably, the processor 602 is specifically configured to:

determine that the synchronization sequence is carried in a predetermined location of the downlink signal.

If coverage of the cell needs to be enhanced, a coverage enhancement level that can be supported by the current cell needs to be notified. Corresponding to configurations on a network side, and there are the following several specific implementation manners:

In a first specific implementation manner, the processor 602 is further configured to:

acquire, according to a preset correspondence between a synchronization sequence and a coverage enhancement level, the coverage enhancement level corresponding to the synchronization sequence, where different coverage enhancement levels are respectively corresponding to different synchronization sequences in the correspondence; and determine the acquired coverage enhancement level as the coverage enhancement level that can be supported by the current cell.

In a second specific implementation manner, the processor 602 is further configured to:

determine relevant information of a physical resource occupied by the synchronization sequence;

acquire, according to a preset correspondence between a coverage enhancement level and relevant information of a physical resource occupied by a synchronization sequence, the coverage enhancement level corresponding to the determined relevant information of the physical resource, where different coverage enhancement levels are respectively corresponding to relevant information of different physical resources in the correspondence; and determine the acquired coverage enhancement level as the coverage enhancement level that can be supported by the current cell.

In a third specific implementation manner, the processor 602 is further configured to:

select, according to a preset correspondence between synchronization sequence density and a coverage enhancement level, synchronization sequence density corresponding to the coverage enhancement level that can be supported by the current cell, where different coverage enhancement levels are respectively corresponding to different synchronization sequence density in the correspondence; and carry, in the downlink signal, the synchronization sequence sorted according to the selected synchronization sequence density.

In a fourth specific implementation manner, the processor 602 is further configured to:

select, according to a preset correspondence between a coverage enhancement level and a value of a second indicator bit, a value that is of a second indicator bit and that is corresponding to the coverage enhancement level that can be supported by the current cell, where different coverage enhancement levels are respectively corresponding to different values of the second indicator bit in the correspondence; and carry the second indicator bit in the downlink signal, where the second indicator bit is set to the selected value of the second indicator bit.

In a fifth specific implementation manner, the processor 602 is further configured to:

select, according to a preset correspondence between a coverage enhancement level and a frequency hopping manner, a frequency hopping manner corresponding to the coverage enhancement level that can be supported by the current cell, where different coverage enhancement levels are respectively corresponding to different frequency hopping manners in the correspondence; and generate the downlink signal according to the selected frequency hopping manner.

Figure 7:
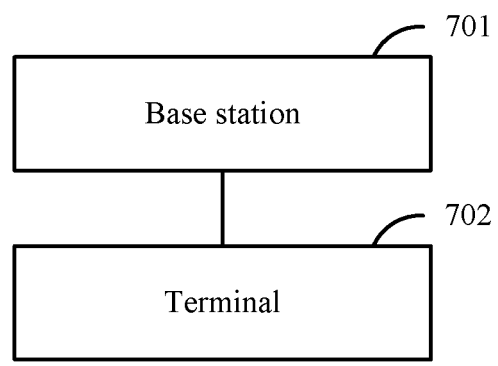
FIG. 7 is a schematic diagram of an architecture of a system according to another embodiment of the present invention.

In a seventh embodiment of the present invention, a system for notifying a terminal type supported by a current cell is provided. For specific implementation of the system, refer to descriptions in the foregoing first embodiment and second embodiment, and no repeated description is provided. As shown in FIG. 7, the system mainly includes:

a base station 701, configured to carry preset indication information in a downlink signal, where the indication information is used to indicate that the terminal type supported by the current cell includes a narrowband terminal, and send the downlink signal to a terminal; and the terminal 702, configured to receive the downlink signal sent by the base station, and determine, according to the preset indication information carried in the downlink signal, that the terminal type supported by the current cell includes the narrowband terminal.

The terminal 702 is further configured to: after determining the terminal type supported by the current cell, determine whether a terminal type of the terminal 702 belongs to the terminal type supported by the current cell. If the terminal type of the terminal 702 belongs to the terminal type supported by the current cell, the terminal 702 continues to access the current cell; or if the terminal type of the terminal 702 does not belong to the terminal type supported by the current cell, the terminal 702 selects another cell for access.

The indication information is a synchronization sequence or a first indicator bit used to indicate whether the current cell supports the narrowband terminal.

Preferably, the base station is specifically configured to:

carry the synchronization sequence in a predetermined location of the downlink signal, where the predetermined location is agreed upon by the base station and the narrowband terminal in advance.

The terminal is specifically configured to:

determine that the synchronization sequence is carried in the predetermined location of the downlink signal.

In a specific implementation process, the base station is further configured to add the synchronization sequence to any location or the predetermined location of the downlink signal.

A physical resource is a time domain resource, a frequency domain resource, or a code domain resource.

If coverage of the cell needs to be enhanced, a coverage enhancement level that can be supported by the current cell needs to be notified, and there are the following several specific implementation manners:

In a first specific implementation manner, the base station is further configured to:

select, according to a preset correspondence between a coverage enhancement level and a synchronization sequence, the synchronization sequence corresponding to the coverage enhancement level that can be supported by the current cell, where different coverage enhancement levels are respectively corresponding to different synchronization sequences in the correspondence; and add the selected synchronization sequence to the downlink signal, where the synchronization sequence occupies a newly added physical resource.

The terminal is further configured to:

acquire, according to the preset correspondence between the synchronization sequence and the coverage enhancement level, the coverage enhancement level corresponding to the synchronization sequence carried in the downlink signal; and determine the acquired coverage enhancement level as the coverage enhancement level that can be supported by the current cell.

In a second specific implementation manner, the base station is further configured to:

select, according to a preset correspondence between a coverage enhancement level and relevant information of a physical resource occupied by a synchronization sequence, relevant information that is of a physical resource occupied by the synchronization sequence and that is corresponding to the coverage enhancement level that can be supported by the current cell, where different coverage enhancement levels are corresponding to relevant information of different physical resources in the correspondence, determine the physical resource according to the selected relevant information of the physical resource, and carry the synchronization sequence on the physical resource.

The terminal is further configured to:

determine the relevant information of the physical resource occupied by the synchronization sequence carried in the downlink signal; acquire, according to the preset correspondence between the coverage enhancement level and the relevant information of the physical resource occupied by the synchronization sequence, the coverage enhancement level corresponding to the determined relevant information of the physical resource; and determine the acquired coverage enhancement level as the coverage enhancement level as the coverage enhancement level that can be supported by the current cell.

In a third specific implementation manner, the base station is further configured to:

select, according to a preset correspondence between synchronization sequence density and a coverage enhancement level, synchronization sequence density corresponding to the coverage enhancement level that can be supported by the current cell, where different coverage enhancement levels are respectively corresponding to different synchronization sequence density in the correspondence; and carry, in the downlink signal, the synchronization sequence sorted according to the selected synchronization sequence density.

The terminal is further configured to:

determine the synchronization sequence density of the synchronization sequence carried in the downlink signal; acquire, according to the preset correspondence between the synchronization sequence density and the coverage enhancement level, the coverage enhancement level corresponding to the determined synchronization sequence density; and determine the acquired coverage enhancement level as the coverage enhancement level that can be supported by the current cell.

In a fourth specific implementation manner, the base station is further configured to:

select, according to a preset correspondence between a coverage enhancement level and a value of a second indicator bit, a value that is of a second indicator bit and that is corresponding to the coverage enhancement level that can be supported by the current cell, where different coverage enhancement levels are respectively corresponding to different values of the second indicator bit in the correspondence; and carry the second indicator bit in the downlink signal, where the second indicator bit is set to the selected value of the second indicator bit.

The terminal is further configured to:

determine that the second indicator bit is carried in the downlink signal, and acquire the value of the second indicator bit; select, according to the preset correspondence between the coverage enhancement level and the value of the second indicator bit, the coverage enhancement level corresponding to the acquired value of the second indicator bit; and determine the selected coverage enhancement level as the coverage enhancement level that can be supported by the current cell.

In a fifth specific implementation manner, the base station is further configured to:

select, according to a preset correspondence between a coverage enhancement level and a frequency hopping manner, a frequency hopping manner corresponding to the coverage enhancement level that can be supported by the current cell, where different coverage enhancement levels are respectively corresponding to different frequency hopping manners in the correspondence; and generate the downlink signal according to the selected frequency hopping manner.

The terminal is further configured to:

determine the frequency hopping manner adopted by the downlink signal; acquire, according to the preset correspondence between the coverage enhancement level and the frequency hopping manner, the coverage enhancement level corresponding to the determined frequency hopping manner; and determine the acquired coverage enhancement level as the coverage enhancement level that can be supported by the current cell.

Based on the foregoing technical solutions, in the embodiments of the present invention, preset indication information is carried in a downlink signal, where the indication information may be a synchronization sequence or a first indicator bit used to indicate a supported terminal type. The indication information indicates the terminal type supported by a current cell, which overcomes a disadvantage in the prior art that a terminal cannot quickly learn a terminal type supported by a network, so that after receiving the downlink signal, the terminal may quickly learn, according to the preset indication information carried in the downlink signal, the terminal type supported by the current cell.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for notifying a terminal of a terminal type supported by a current cell, comprising:

generating, by a base station, a downlink signal that carries preset indication information, wherein the preset indication information indicates the terminal type supported by the current cell, and the preset indication information is a synchronization sequence or a first indicator bit used to indicate the terminal type supported by the current cell; and sending, by the base station, the downlink signal to the terminal, wherein before generating the downlink signal that carries the preset indication information, the method further comprises:

selecting, according to a preset correspondence between coverage enhancement levels and synchronization sequences, a synchronization sequence corresponding to a coverage enhancement level that can be supported by the current cell, wherein different coverage enhancement levels respectively correspond to different synchronization sequences.

2. The method according to claim 1, wherein generating the downlink signal that carries the preset indication information comprises:
adding the synchronization sequence to the downlink signal.

3. The method according to claim 1, wherein before generating the downlink signal that carries the preset indication information, the method further comprises:
selecting, according to a preset correspondence between synchronization sequence densities and coverage enhancement levels, a synchronization sequence density corresponding to a coverage enhancement level that can be supported by the current cell, wherein different coverage enhancement levels respectively correspond to different synchronization sequence densities; and
wherein the downlink signal further carries the synchronization sequence sorted according to the selected synchronization sequence density.

4. A method for notifying a terminal of a terminal type supported by a current cell, comprising:
receiving, by the terminal, a downlink signal from the current cell; and
determining, by the terminal, according to preset indication information carried in the downlink signal, the terminal type supported by the current cell, wherein the preset indication information is a synchronization sequence or a first indicator bit used to indicate the terminal type supported by the current cell,
wherein the method further comprises:
acquiring, according to a preset correspondence between synchronization sequences and coverage enhancement levels, a coverage enhancement level corresponding to the synchronization sequence, wherein different coverage enhancement levels respectively correspond to different synchronization sequences; and
determining the acquired coverage enhancement level as a coverage enhancement level that can be supported by the current cell.

5. The method according to claim 4, wherein after determining the acquired coverage enhancement level as the coverage enhancement level that can be supported by the current cell, the method further comprises:
determining a value of strength of the downlink signal;
comparing the value of the strength of the downlink signal with a preset threshold to determine a coverage enhancement level that needs to be supported by the current cell so that the terminal can successfully access the current cell; and
based on whether or not the determined coverage enhancement level that can be supported by the current cell can meet the coverage enhancement level that needs to be supported by the current cell, accessing the current cell or selecting another cell for access.

6. The method according to claim 5, wherein comparing the value of the strength of the downlink signal with the preset threshold to determine a coverage enhancement level that needs to be supported by the current cell so that the terminal can successfully access the current cell comprises:

comparing the value of the strength of the downlink signal with a preset first threshold and a preset second threshold; and
wherein the method further comprises:
based on whether the value of the strength of the downlink signal is: (1) not less than the first threshold, (2) greater than or equal to the second threshold and less than the first threshold, or (3) not greater than the second threshold, determining that the current cell needs to support: (1) a first coverage enhancement level so that the terminal can successfully access the current cell, (2) a second coverage enhancement level so that the terminal can successfully access the current cell, or (3) a third coverage enhancement level so that the terminal can successfully access the current cell, respectively;
wherein coverage enhancement capabilities corresponding to the first coverage enhancement level, the second coverage enhancement level, and the third coverage enhancement level are in ascending order.

7. The method according to claim 4, wherein the method further comprises:
determining a synchronization sequence density of the synchronization sequence;
acquiring, according to a preset correspondence between synchronization sequence densities and coverage enhancement levels, a coverage enhancement level corresponding to the determined synchronization sequence density, wherein different coverage enhancement levels respectively correspond to different synchronization sequence densities in the correspondence; and
determining the acquired coverage enhancement level as a coverage enhancement level that can be supported by the current cell.

8. The method according to claim 4, wherein after determining the terminal type supported by the current cell, the method further comprises:
determining whether a terminal type of the terminal belongs to the terminal type supported by the current cell; and
based on whether or not the terminal type of the terminal belongs to the terminal type supported by the current cell, continuing to access the current cell or selecting another cell for access, respectively.

9. A base station, comprising:
a processor, configured to generate a downlink signal that carries preset indication information, wherein the preset indication information indicates a terminal type supported by a current cell, and the preset indication information is a synchronization sequence or a first indicator bit used to indicate the terminal type supported by the current cell; and
a sender, configured to send the downlink signal to the terminal,
wherein the processor is further configured to:
select, according to a preset correspondence between coverage enhancement levels and synchronization sequences, a synchronization sequence corresponding to a coverage enhancement level that can be supported by the current cell, wherein different coverage enhancement levels respectively correspond to different synchronization sequences.

10. The base station according to claim 9, wherein the processor is further configured to:
add the synchronization sequence to the downlink signal.

11. The base station according to claim 9, wherein the processor is further configured to:
   select, according to a preset correspondence between synchronization sequence densities and coverage enhancement levels, a synchronization sequence density corresponding to a coverage enhancement level that can be supported by the current cell, wherein different coverage enhancement levels respectively correspond to different synchronization sequence densities; and
   wherein the downlink signal carries the synchronization sequence sorted according to the selected synchronization sequence density.

12. A terminal, comprising:
   a receiver, configured to receive a downlink signal from a current cell; and
   a processor, configured to determine, according to preset indication information carried in the downlink signal, a terminal type supported by the current cell, wherein and the preset indication information is a synchronization sequence or a first indicator bit used to indicate the terminal type supported by the current cell,
   wherein the processor is further configured to:
   acquire, according to a preset correspondence between synchronization sequences and coverage enhancement levels, a coverage enhancement level corresponding to the synchronization sequence, wherein different coverage enhancement levels respectively correspond to different synchronization sequences; and
   determine the acquired coverage enhancement level as a coverage enhancement level that can be supported by the current cell.

13. The terminal according to claim 12, wherein the processor is further configured to:
   determine a value of strength of the downlink signal;
   compare the value of the strength of the downlink signal with a preset threshold to determine a coverage enhancement level that needs to be supported by the current cell so that the terminal can successfully access the current cell; and
   if the determined coverage enhancement level that can be supported by the current cell can meet the coverage enhancement level that needs to be supported by the current cell, access the current cell; or
   if the determined coverage enhancement level that can be supported by the current cell cannot meet the coverage enhancement level that needs to be supported by the current cell, select another cell for access.

14. The terminal according to claim 13, wherein the processor is further configured to:
   compare the value of the strength of the downlink signal with a preset first threshold and a preset second threshold; and
   if the value of the strength of the downlink signal is not less than the first threshold, determine that the current cell needs to support a first coverage enhancement level so that the terminal can successfully access the current cell; or
   if the value of the strength of the downlink signal is greater than or equal to the second threshold and is less than the first threshold, determine that the current cell needs to support a second coverage enhancement level so that the terminal can successfully access the current cell; or
   if the value of the strength of the downlink signal is not greater than the second threshold, determine that the current cell needs to support a third coverage enhancement level so that the terminal can successfully access the current cell;
   wherein coverage enhancement capabilities corresponding to the first coverage enhancement level, the second coverage enhancement level, and the third coverage enhancement level are in ascending order.

15. The terminal according to claim 12, wherein the processor is further configured to:
   determine a synchronization sequence density of the synchronization sequence;
   acquire, according to a preset correspondence between synchronization sequence densities and coverage enhancement levels, a coverage enhancement level corresponding to the determined synchronization sequence density, wherein different coverage enhancement levels respectively correspond to different synchronization sequence densities in the correspondence; and
   determine the acquired coverage enhancement level as a coverage enhancement level that can be supported by the current cell.

16. The terminal according to claim 12, wherein the processor is further configured to:
   determine whether a terminal type of the terminal belongs to the terminal type supported by the current cell; and
   if the terminal type of the terminal belongs to the terminal type supported by the current cell, continue to access the current cell; or if the terminal type of the terminal does not belong to the terminal type supported by the current cell, select another cell for access.

* * * * *

UNITED STATES PATENT AND TRADEMARK OFFICE
CERTIFICATE OF CORRECTION

PATENT NO. : 10,129,840 B2
APPLICATION NO. : 15/246231
DATED : November 13, 2018
INVENTOR(S) : Song Zhu et al.

Page 1 of 1

It is certified that error appears in the above-identified patent and that said Letters Patent is hereby corrected as shown below:

On the Title Page

Page 2, item (56) References Cited, Foreign Patent Documents, "DE 2672756 A1" should read -- EP 2672756 A1 --.

Signed and Sealed this
Tenth Day of September, 2019

Andrei Iancu
*Director of the United States Patent and Trademark Office*